US012692961B2

(12) United States Patent
Hsu et al.

(10) Patent No.: US 12,692,961 B2
(45) Date of Patent: Jul. 28, 2026

(54) MISTOUCH PREVENTION LOCKING STRUCTURE AND FEMALE CONNECTOR STRUCTURE THEREOF

(71) Applicant: FOSITEK CORPORATION, New Taipei City (TW)

(72) Inventors: An-Szu Hsu, New Taipei City (TW); Chia-Meng Chang, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 0 days.

(21) Appl. No.: 18/956,236

(22) Filed: Nov. 22, 2024

(65) Prior Publication Data

US 2026/0104119 A1 Apr. 16, 2026

(30) Foreign Application Priority Data

Oct. 11, 2024 (TW) ................................. 113138800

(51) Int. Cl.
*F16L 37/086* (2006.01)
*F16L 37/084* (2006.01)
*F16L 37/14* (2006.01)

(52) U.S. Cl.
CPC ......... *F16L 37/086* (2013.01); *F16L 37/0841* (2013.01); *F16L 37/144* (2013.01)

(58) Field of Classification Search
CPC .... F16L 37/144; F16L 37/086; F16L 37/0841
See application file for complete search history.

(56) References Cited

U.S. PATENT DOCUMENTS

| | | | | |
|---|---|---|---|---|
| 5,845,943 | A | * 12/1998 | Ramacier, Jr. | ...... F16L 37/0841 |
| 12,331,865 | B1 | * 6/2025 | Hsu | ...................... F16L 37/086 |
| 12,338,927 | B1 | * 6/2025 | Kuo | .................... F16L 37/0841 |
| 12,455,030 | B2 | * 10/2025 | Vranish | ................. F16L 37/086 |
| 2024/0328549 | A1 | * 10/2024 | Takashima | .............. F16L 37/32 |
| 2025/0283565 | A1 | * 9/2025 | Takashima | ............ F16L 37/084 |

FOREIGN PATENT DOCUMENTS

| | | |
|---|---|---|
| CN | 117712771 A | 3/2024 |
| CN | 118548380 A | 8/2024 |
| TW | M667289 U | 3/2025 |

OTHER PUBLICATIONS

Search Report dated May 8, 2025 issued by Taiwan Intellectual Property Office for counterpart application No. 113138800.

* cited by examiner

Primary Examiner — Zachary T Dragicevich
(74) Attorney, Agent, or Firm — Demian K. Jackson; Jackson IPG PLLC

(57) ABSTRACT
A mistouch prevention locking structure includes a main body, a sleeve, and a pressing assembly. The main body with a plug channel formed inside, a combination groove recessed in the plug channel of the main body, and a hole penetrating from one side of the combination groove. The sleeve is disposed outside the main body and is provided with an opening. The pressing assembly has a ring body, a pressing body and a spring, the ring body is arranged in the combination groove, the pressing body is arranged inside the opening and is connected to the ring body through the hole, the spring is located between the pressing body and the main body. One end of the main body is provided with a stopper, the outer diameter of the stopper has the same height as a pressing surface of the pressing body or is slightly higher depth.

11 Claims, 9 Drawing Sheets

MISTOUCH PREVENTION LOCKING STRUCTURE AND FEMALE CONNECTOR STRUCTURE THEREOF

This application claims the priority benefit of Taiwan patent application number 113138800 filed on Oct. 11, 2024, the disclosure of which is hereby incorporated by reference in its entirety.

BACKGROUND OF THE INVENTION

1. Field of the Invention

The present invention relates to a locking structure, and more particularly to a locking structure used to mistouch prevention when connecting male connector and female connector.

2. Description of the Related Art

In the prior art, in the existing water-cooling couplings, the connection or separation of a male connector and a female connector is achieved by a button-type locking structure.

Please refer to FIGS. 1 and 2, a water-cooling coupling is usually equipped with a button-type locking structure on a female connector. The button-type locking structure has a main body. The main body is arranged at the front end of the female connector. The main body has a hole with a ring body. The ring body has a pressing body corresponding to the hole on its periphery, and an arc-shaped block is arranged inside to face the pressing body. The ring body will be continuously resisted by a spring, so that without external force, the pressing body of the ring body is exposed on the outer surface of the main body, and the ring body moves in a plug channel of the main body. Therefore, when the male connector is inserted into the female connector, the arc-shaped block in the ring body interacts with the ring-shaped groove of the male connector, so that the male connector is connected to the female connector. In addition, when the user applies an external force to the pressing body to compress the spring, the arc-shaped block of the ring body withdraws from the ring-shaped groove, so that the male connector and female connector can be separated.

However, in the prior art, the water-cooling couplings is configured in a space with limited space and the smallest possible volume. Therefore, the operation of combination or separation becomes inconvenient due to space limitations. And because space is limited, unexpected collisions or extrusions may easily occur. At this time, due to being resisted by the spring, the pressing body of the ring body from the outer surface of the main body, so it is easy for the pressing body to be acted upon by unexpected external forces during use or assembly, thereby causing the male connector to separate from the female connector.

Therefore, how to resolve the above-mentioned problems has become the direction of effort for researchers in this field.

SUMMARY OF THE INVENTION

One of the objectives of the present invention is to provide a mistouch prevention locking structure that a male connector and a female connector can be assembled or separated in a limited space.

Another objective of the present invention is to provide a mistouch prevention locking structure that effectively prevent unexpected separation of the male connector and the female connector due to mistouching of a button by unexpected external force.

To achieve the above objectives, the present invention provides a mistouch prevention locking structure being used for combination or separation of the male connector and the female connector. It includes a main body, a sleeve, and a pressing assembly. The main body is with a plug channel formed inside the main body, wherein a combination groove is in the plug channel of the main body, and a hole is penetrating from one side of the combination groove. The sleeve is disposed outside the main body and is provided with an opening. The pressing assembly has a ring body, a pressing body and a spring. The ring body is arranged in the combination groove, the pressing body is arranged inside the opening and is connected to the ring body through the hole, and the spring is located between the pressing body and the main body. One end of the main body is provided with a stopper. An outer diameter of the stopper has the same height as a pressing surface of the pressing body or is slightly higher than the pressing surface.

In addition, the female connector structure comprises a female connector and the mistouch prevention locking structure. The female connector is provided with an annular groove on its outer surface near a front end thereof. The main body of the mistouch prevention locking structure of the main body is provided with a fixing hole at an inner periphery near an rear end of the main body and corresponding to the ring groove, a pin is provided in the fixing hole, and the pin is slidable in and correspondingly to in the annular groove of the female connector, so that the mistouch prevention locking structure can rotate axially relative to the female connector.

Accordingly, this invention provides a mistouch prevention locking structure and a female connector structure thereof. It can complete combination and separation of a male connector and a female connector in a limited space. Also, by the design of the outer diameter of the stopper having the same height as the pressing surface of the pressing body or being slightly higher than the pressing surface, unexpected separation of the male connector and the female connector caused by any unexpected external force mistouching the pressing body can be effectively prevented. Also, this invention provides the female connector structure that allows users to operate combination and separation in the limited space more conveniently.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The aforementioned objectives of the present invention, along with its structure and functional characteristics, will be described based on the preferred embodiment in the accompanying diagrams.

Figure 1:
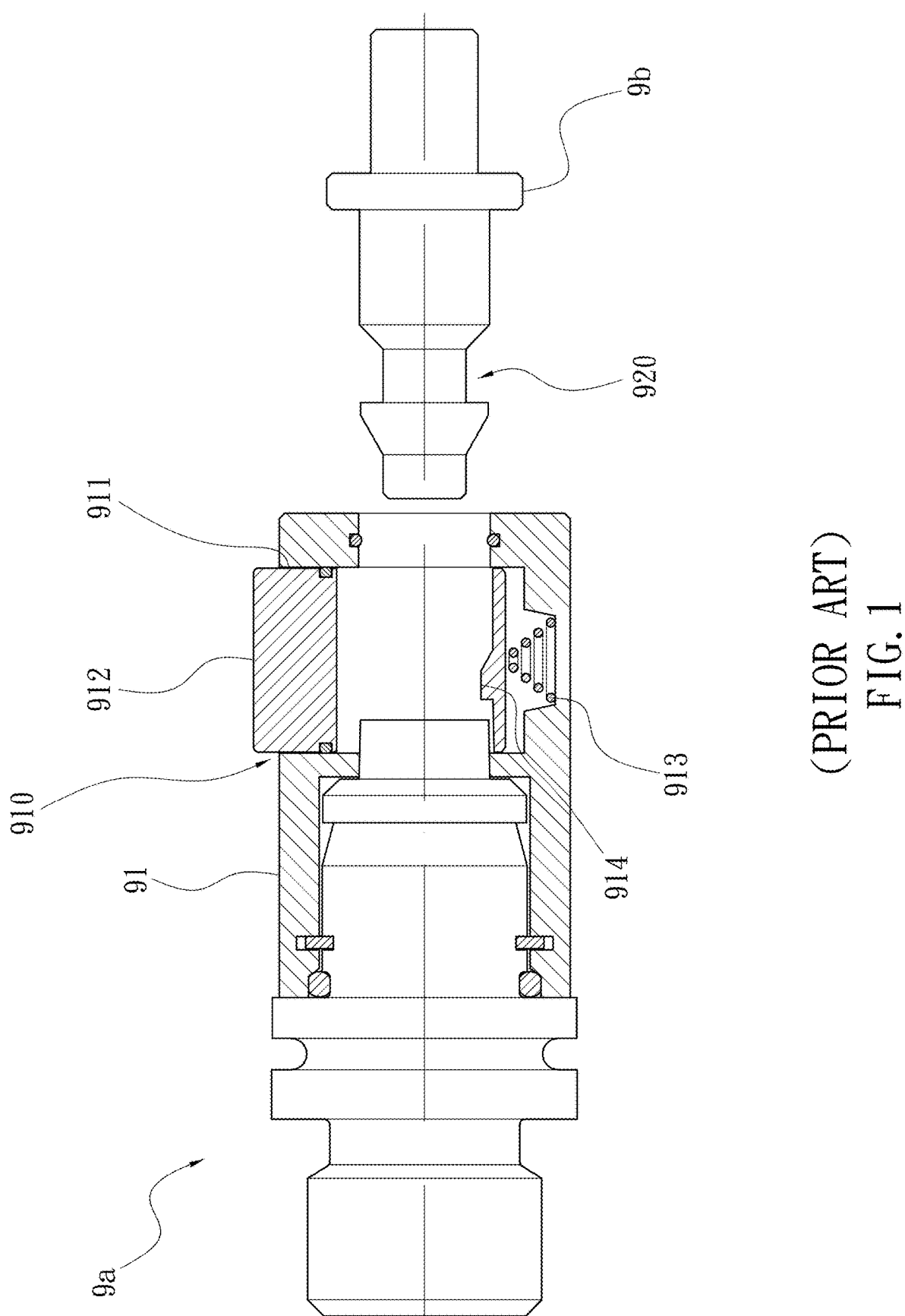
FIG. 1 is a cross-sectional perspective schematic diagram of a water-cooling coupling equipped with a button-type locking structure in the prior art.
Figure 2:
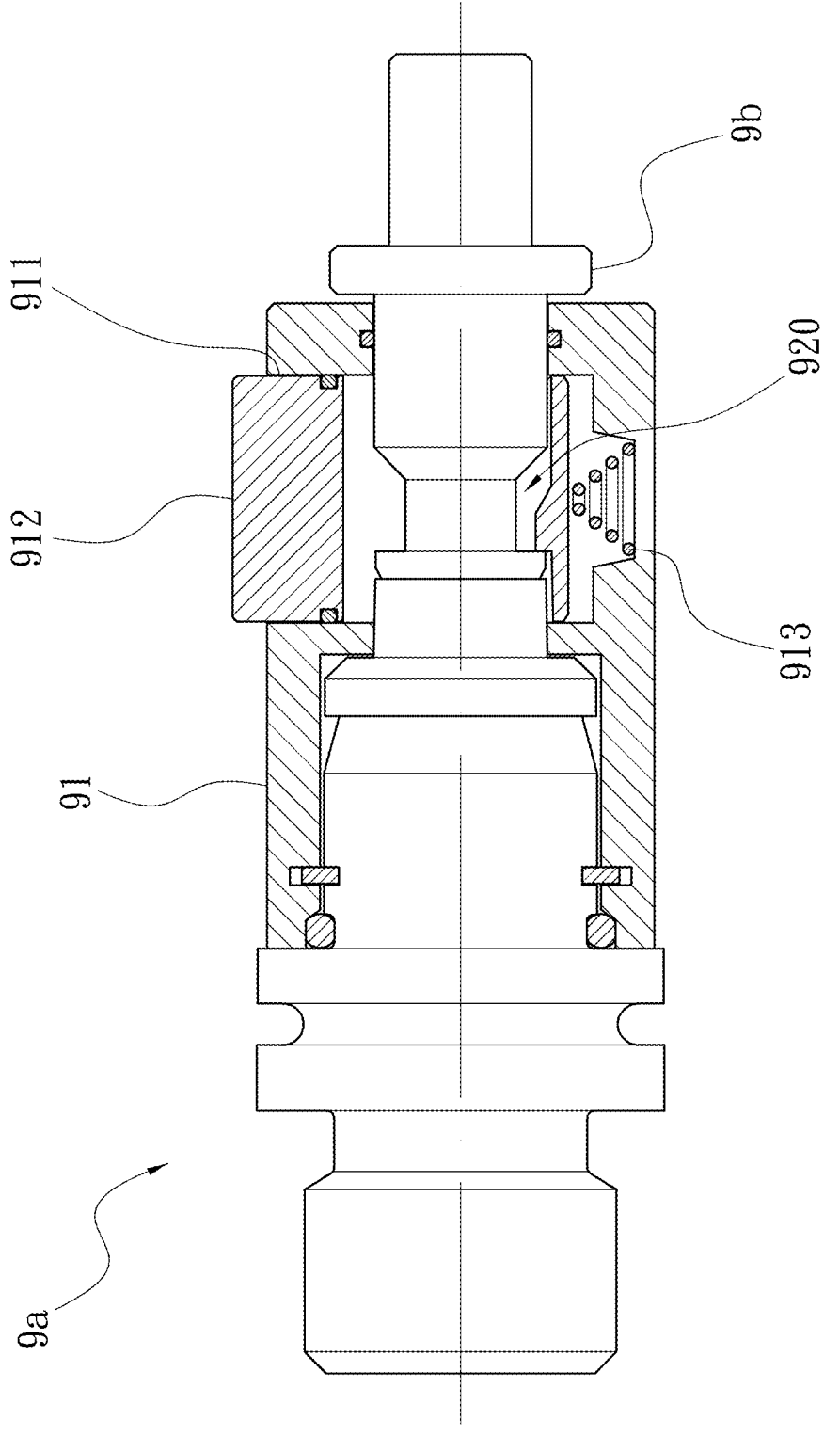
FIG. 2 is a cross-sectional perspective schematic diagram of a water-cooling coupling equipped with a button-type locking structure in the prior art.
Figure 3:
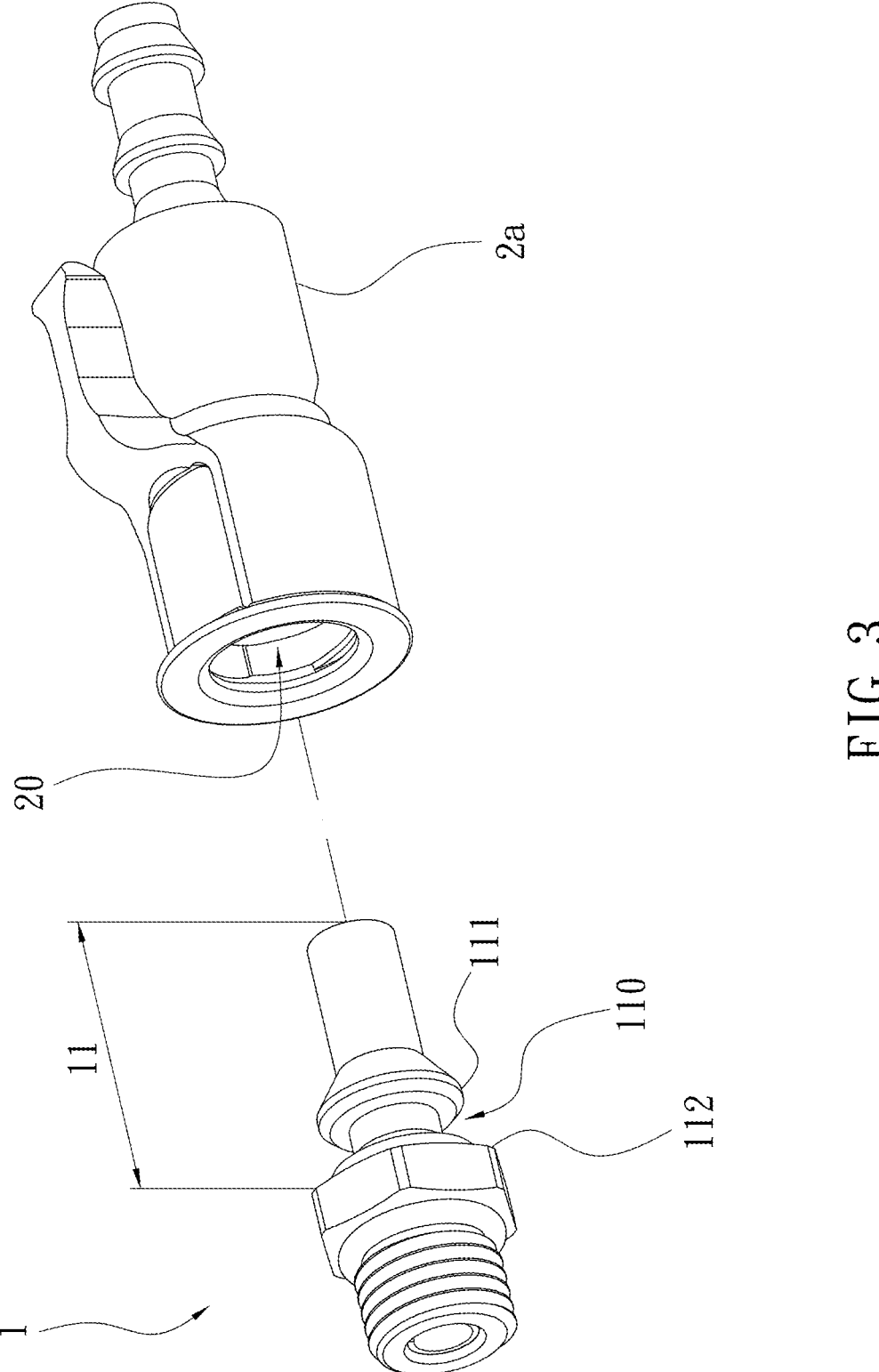
FIG. 3 is a schematic diagram of mistouch prevention locking structure of the present invention.

Please refer to FIG. 3, a mistouch prevention locking structure of the present invention is used for combination or separation between a male connector (1) and a female connector (2a) in a water-cooling coupling. Please refer to FIG. 4, the mistouch prevention locking structure is provided on the female connector (2a). And, during the combination, the male connector (1) is locked by the mistouch prevention locking structure to complete the combination. A trench (110) is provided on the outer surface of a plug part (11) at the front end of the male connector (1). After the male connector (1) is inserted into the mistouch prevention locking structure, the mistouch prevention locking structure will interfere with the trench (110) and thereby cause an axial restriction position.

Figure 4:
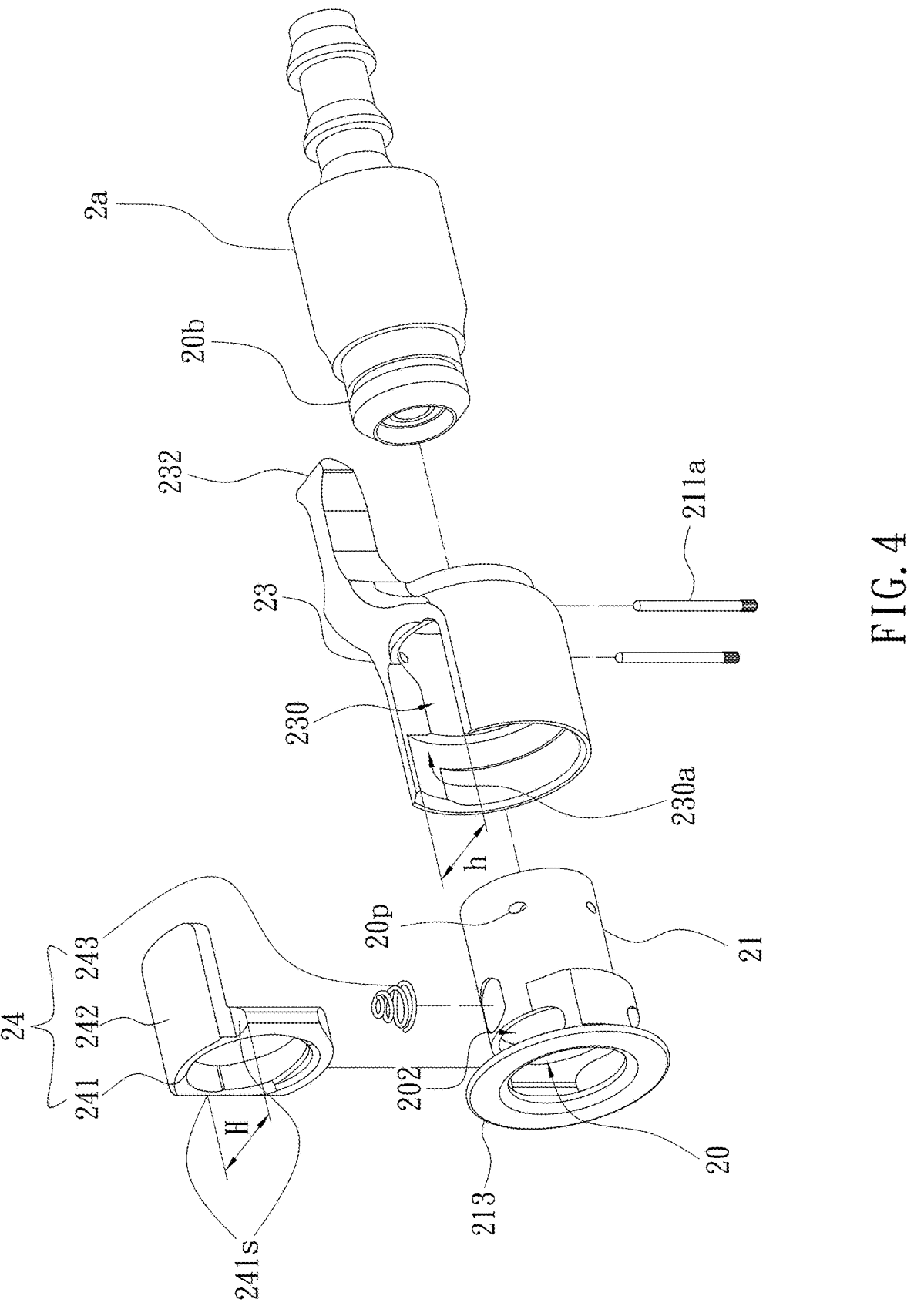
FIG. 4 is an exploded schematic diagram of mistouch prevention locking structure of the present invention.
Figure 5:
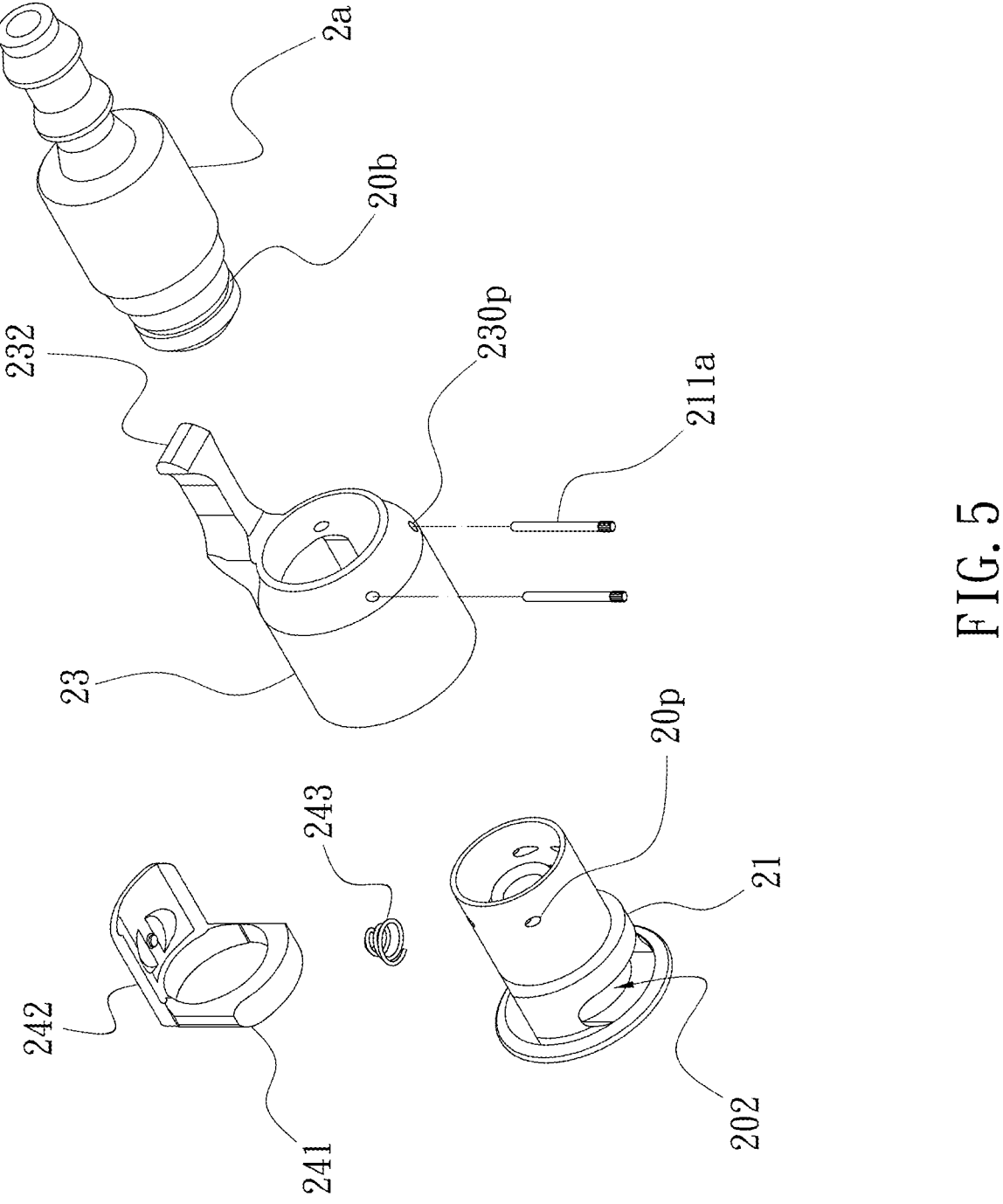
FIG. 5 is an exploded schematic diagram of mistouch prevention locking structure of the present invention.
Figure 6:
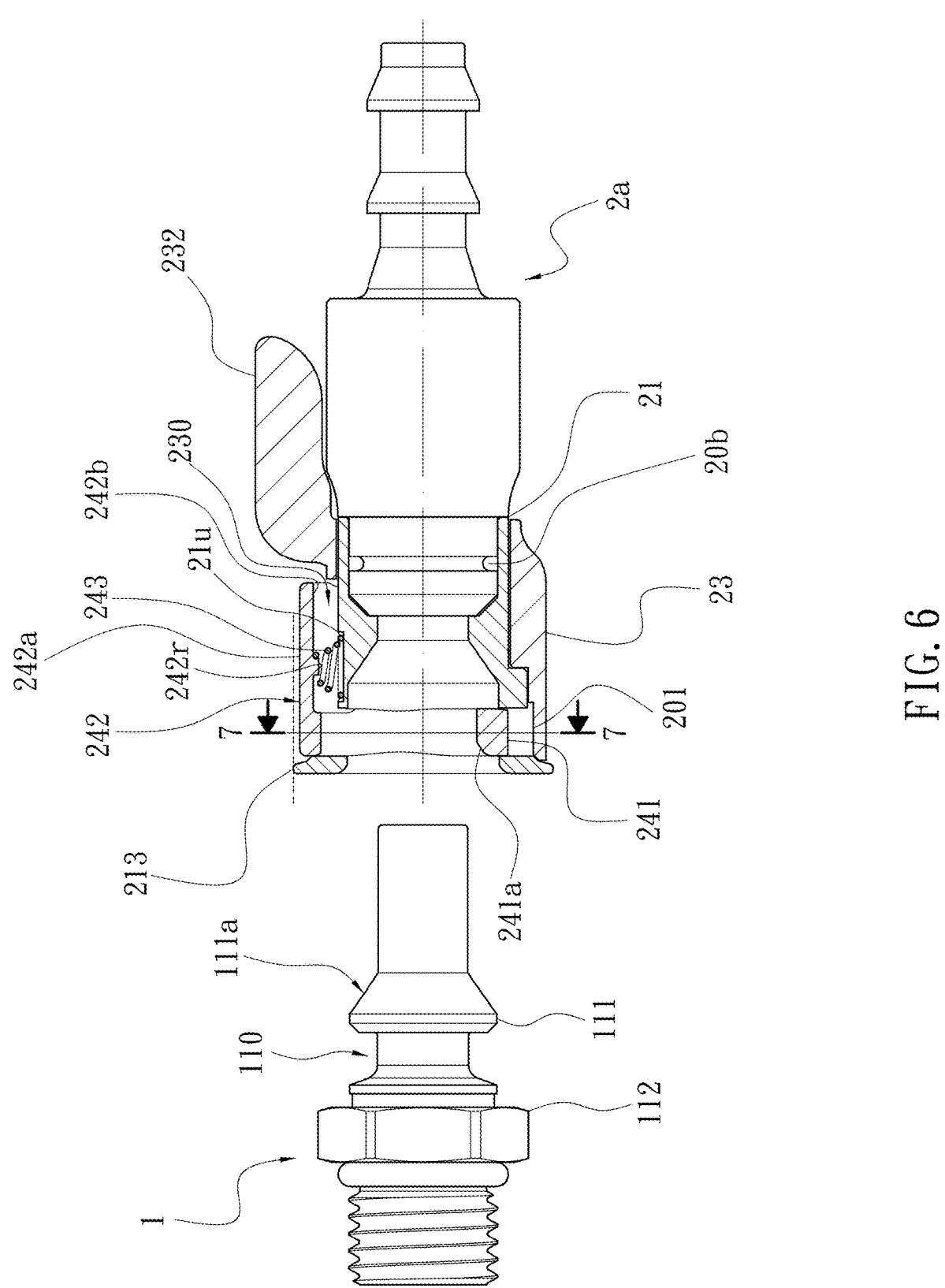
FIG. 6 is a cross-sectional perspective schematic diagram of mistouch prevention locking structure of the present invention.
Figure 7:
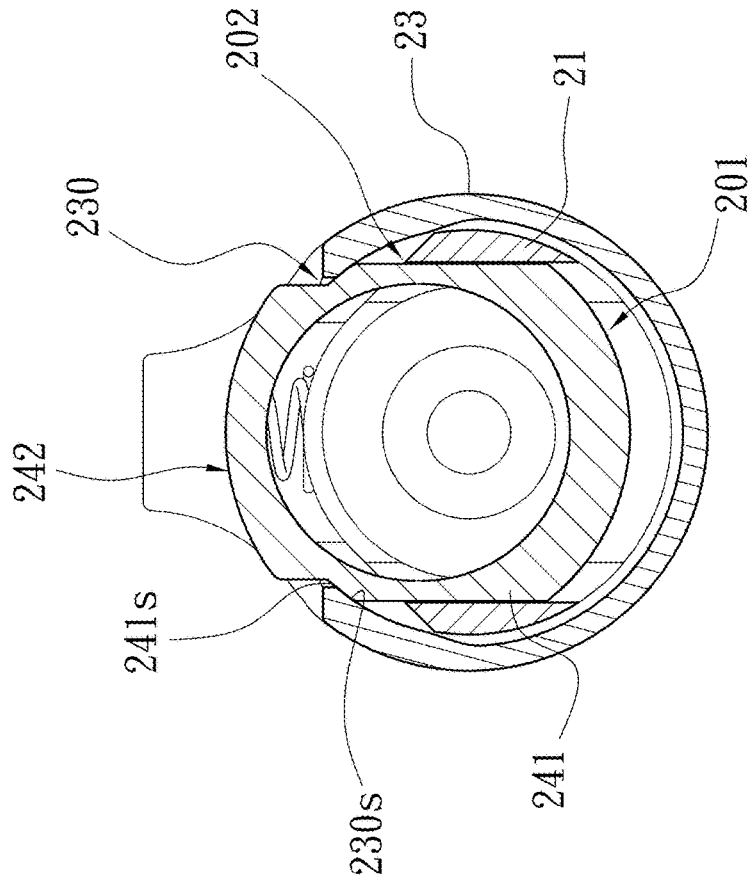
FIG. 7 is a cross-sectional perspective schematic diagram of mistouch prevention locking structure of the present invention along section a-a' in FIG. 6.

Please refer to FIGS. 4-6, the mistouch prevention locking structure of the present invention comprises a main body (21), a sleeve (23), and a pressing assembly (24). Among them, a plug channel (20) is formed inside the main body (21), for the plug part (11) of the male connector (1) to be inserted into the main body (21) from the channel opening at the front end of the plug channel (20) during the assembly process. Meanwhile, the plug channel (20) of the main body (21) is recessed with a combination groove (201) near the front end, and the hole (202) penetrating the main body (21) from at least one side of the combination groove (201). More specifically, as shown in FIG. 7, the combination groove (201) can communicate with the hole (202) on the upper side and the lower side, in a form of uniform aperture vertically penetrating through the main body (21). Therefore, the combination groove (201) can be guided to move vertically (radially) along the opening direction of the hole (202).

The sleeve (23) is disposed outside the main body (21), and the sleeve (23) is provided with an opening (230) at the rear end of the sleeve (23) toward the rear end direction. For example, as shown in FIG. 4, the opening (230) overlaps with and corresponds to the hole (202). Thereby, the plug channel (20) can be connected to the outside of the sleeve (23) through the hole (202) and the opening (230).

The pressing assembly (24) has a ring body (241), a pressing body (242), and a spring (243). The ring body (241) is disposed in the combination groove (201) through the hole (202), so the ring body (241) can move vertically through the hole (202).

Please refer to FIG. 7, the ring body (241) has two shoulders (241s). In this embodiment, the ring body (241) is a U shape, and the two ends of the U shape are connected with the pressing body (242) to respectively form two shoulders (241s). The ring body (241) and the pressing body (242) may be formed integrally. More specifically, the pressing body (242) and the ring body (241) together is a L shape. In addition, the lateral width (h) of the opening (230) of the sleeve (23) is smaller than the shoulder width (H) of the ring body (241), so that the ring body (241) is constrained by the opening (230) and is not detachable from the opening (230) of the sleeve (23).

Specifically, after the ring body (241) passes through the hole (202), the ring body (241) cannot continue its vertically movement since the shoulders (241s) connecting to the both sides of the pressing body (242) are restricted by the blocking portions (230s) adjacent to the both sides of the opening (230) of the sleeve (23); thereby, providing a maximum limiting position for the vertical movement of the ring body (241). Therefore, as shown in FIG. 4, during the assembly process, for completing the assembling of the mistouch prevention locking structure, the ring body (241) of the pressing assembly (24) can be placed into the combination groove (201) of the main body (21) before the sleeve (23) is disposed.

As shown in FIGS. 4 and 6, after the assembling is completed, the ring body (241) is in the combination groove (201), and the pressing body (242) is inside the opening (230) (through the hole 202) and is connected to the ring body (241). And, the pressing body (242) protrudes from the outer surface of the main body (21).

Specifically, the pressing body (242) extends axially along the outer surface of the main body (21) to form a flat plate. The flat plate has a pressing surface (242a) on one side for receiving force from users, and has a receiving surface (242b) on another side facing towards the main body (21). Thereby, the spring (243) can be disposed between the receiving surface (242b) of the pressing body (242) and the outer surface of the main body (21). After the assembling, the pressing assembly (24) is also disposed in the main body (21). Accordingly, the spring (243) will be disposed between the pressing body (242) and the main body (21) providing vertical supports (in the same direction as the hole 202).

It is worth noting that if the pressing assembly (24) is installed before the sleeve (23) is disposed, the spring (243) would need to be compressed by a temporary pre-force (e.g., by continually pressing the pressing body 242), such that the pressing assembly (24) is stably placed in the main body (21) without any positional stop by the sleeve (23) before assembling is completed. When the sleeve (23) is disposed on the outer surface of the main body (21), the assembling of the pressing assembly (24) is completed. Accordingly, said pre-force can be released (e.g., without force applied to the pressing body 242) while the spring 243 is providing supports without causing dislocation since the two shoulders (241s) of the ring body (241) are given positional stop respectively.

As shown in FIG. 6, in order to stably dispose the spring (243) between the pressing body (242) and the main body (21), a plane (or even a groove 21u) can be formed on the outer surface of the main body (21) corresponding to the place at which the spring (243) provides supports. Similarly, the groove (21u) can also be formed at the place corresponding to the receiving surface (242b) of the pressing body (242). Alternatively, a protrusion (242r) can be formed as well corresponding to the axis of the spring (243) such that the spring (243) will not be deviating from the set position easily.

However, in order for conveniently disposing the sleeve (23) onto the main body (21) without affecting the spring (243) already assembled on the main body (21), for example, as shown in FIG. 4, the opening (230) of the sleeve (23) can extend axially to the front end of the sleeve (23) as well and form an open side (230a). During assembling, the sleeve (23) is disposed from the rear end of the main body (21) so that the spring (243) disposed on the outer surface of the main body (21) can be disposed into the opening (230) from the open side (230a). Moreover, the opening (230) also has an axial length that allows the sleeve (23) to be disposed on the main body (21) entirely while the placement of the spring (243) remains undisturbed. If the pressing body (242) matches the size and the shape of the opening (230), the opening (230) will have sufficient axial length.

The present invention has a stopper (213) arranged at and radially extended from one end of the main body (21). As shown in FIG. 6, the outer diameter of the stopper (213) has the same height as a pressing surface (242a) of the pressing body (242) or is slightly higher than the pressing surface (242a). Or, it can even be higher than the pressing surface (242a). Therefore, unexpected external force can be prevented from being applied to the pressing body (242) of the pressing assembly (24). In some embodiments, the pressing surface (242a) of the pressing body (242) may also be within the range of a similar height, e.g., slightly higher than the stopper (213), so long as it can effectively prevent unexpected external force from being applied to the pressing body (242) of the pressing assembly (24). The present invention is not limited to it.

The stopper (213) can also provide a function of positional limitation. For example, during the assembling, when the sleeve (23) is disposed on the rear end of the main body (21), the front end of the sleeve (23) stops from sliding forward after contacting the stopper (213) and being constrained. This provides assembling with higher stability. And, at the same time, the open side (230a) at the front end of the opening (230) of the sleeve (23) is closed by the stopper (213).

Please refer to FIGS. 6-9, which show various states from insertion to completed combination in the actual use of the present invention. Before combination, the spring (243) supports the pressing body (242) and the main body (21) by being placed between them with no external force applied thereon. Therefore, there would be an offset between the axis of the ring body (241) and the axis of the plug channel (20) of the main body (21). At the same time, the distal end of the ring body (241) relative to the pressing body (242) will be exposed in the plug channel (20).

Figure 8:
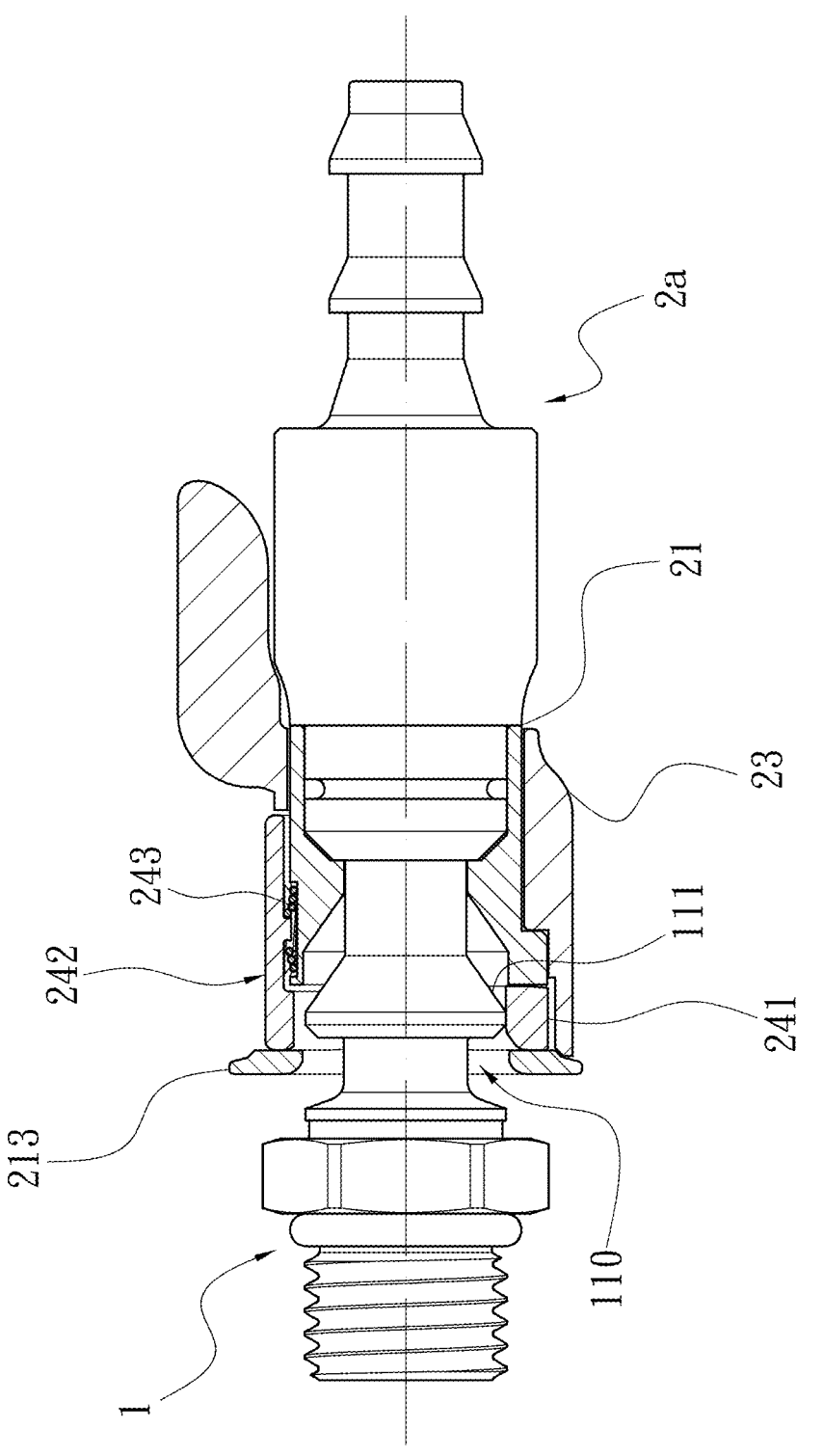
FIG. 8 is a cross-sectional perspective schematic diagram of mistouch prevention locking structure of the present invention.

Please refer to FIGS. 6-8, the trench (110) of the male connector (1) can be formed between a protruding portion (111) of an inclined surface (111a) and a flat surface (112) in a recessed form. When the male connector (1) and the female connector (2a) are being combined, the plug part (11) would be pushed by an axial external force to be inserted into the plug channel (20). Since the protruding portion (111) has the inclined surface (111a) heading toward the front end, the inclined surface (111a) will convert the axial directed force into a vertical one, driving the inner periphery of the ring body (241) away from the plug channel (20) and compressing the spring (243). As such, the extent of the vertical movement (and the axial offset) is gradually reduced until the protruding portion (111) can be fully passed.

In other embodiments, as shown in FIG. 6, the inner periphery of the ring body (241) heading toward the front end, corresponding to the inclined surface (111a), can also be formed with a conical inclined slope (241a) heading toward the direction from which the male connector (1) is inserted. The ring conical inclined slope (241a) may be parallel to the inclined surface (111a). Accordingly, with the two inclined surfaces facing each other in a face-to-face manner to increase the effective force supporting surface area that converts axial directed force into the vertical one, the axial directed external force conveyed by the inclined surface (111a) can be converted into a vertical force to compress the spring (243) more evenly during the assembling.

Figure 9:
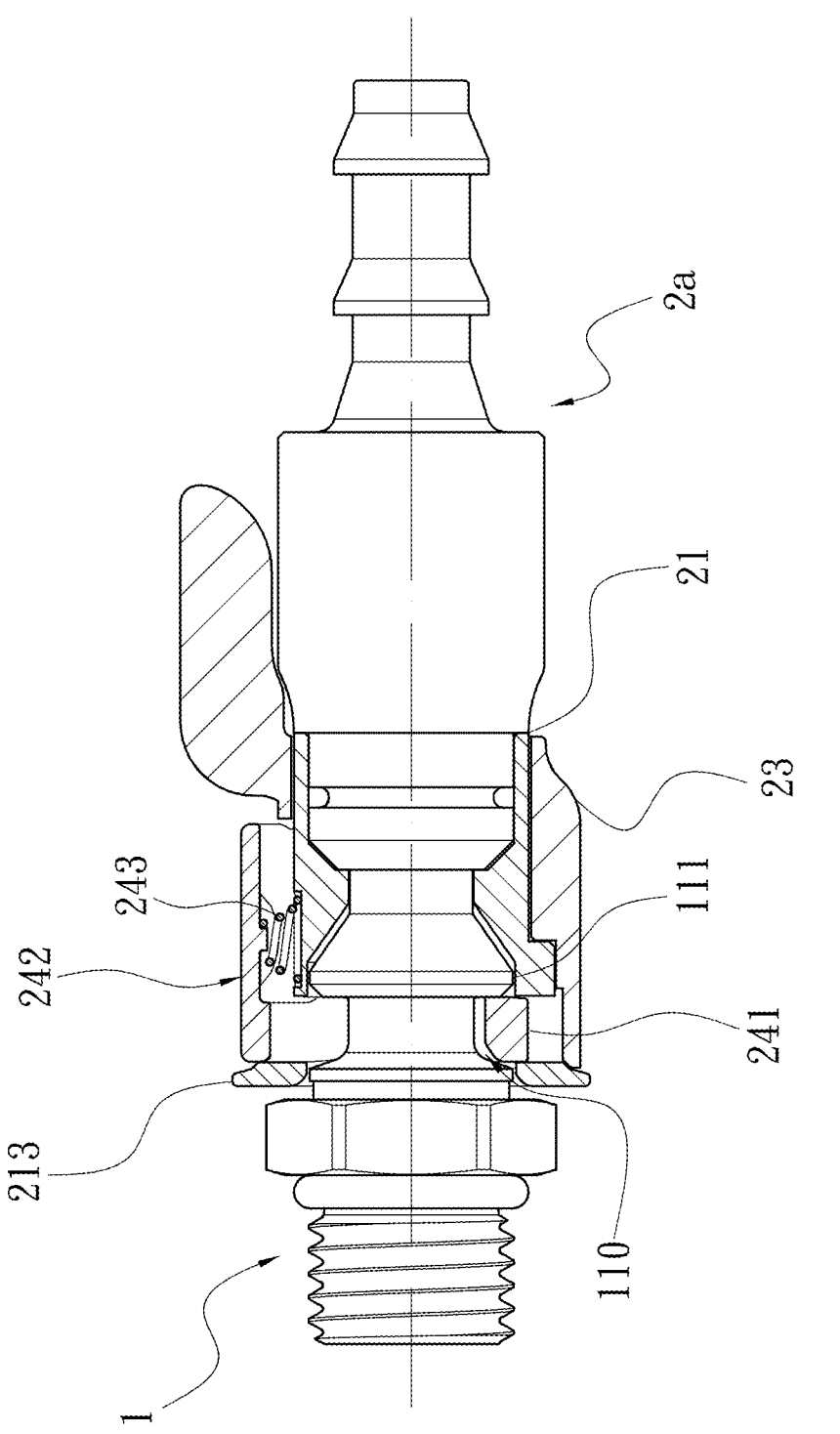
FIG. 9 is a cross-sectional perspective schematic diagram of mistouch prevention locking structure of the present invention.

As shown in FIGS. 8 and 9, after the protruding portion (111) passes, the ring body (241) will be driven by the spring (243), causing axial deviation and vertically movement again due to the absence of the external force. The ring body (241) then enters the trench (110) to complete the combination, thereby achieving the effect of limiting the axial position.

Following, if users want to separate the male connector (1) and the female connector (2a), users only need to apply an external force vertically to the pressing surface (242a) of the pressing body (242) to compress the spring (243), so that the ring body (241) is pressed down and then sufficiently enters the combination groove (201) (exit the trench 110), and the plug part (11) can be separated from the ring body (241). In order for users to apply force more conveniently, the diameter of the spring (243) may gradually expand from the pressing body (242) toward the outer surface of the main body (21), to guide the force applied by users on the pressing body (242) to remain vertically transferred. As shown in FIG. 6, as such, the protrusion (242r) can be provided on the receiving surface (242b) corresponding to the end of the spring (243) with a smaller diameter, and the groove can be provided on the end of main body (21) corresponding to the end of the spring (243) with a larger diameter.

In summary, according to the present invention, the stopper (213) at least has the same height (or slightly higher than) as the pressing body (242), which can effectively shield unexpected external forces and prevent unexpected separation. Furthermore, the present invention does not increase the unnecessary volume of the mistouch prevention locking structure, while effectively preventing the male connector (1) from being unexpectedly separated from the female connector (2a) due to unexpected external force in a limited space, making it more convenient for users to operate in a limited space.

Please refer to FIGS. 4-6, the female connector (2a) is provided with the annular groove (20b) on its outer surface near the front end. The main body (21) of the mistouch prevention locking structure near the rear end is correspondingly matched (for example, concave and convex) with the annular groove (20b) of the female connector (2a). The main body (21) is provided with a corresponding fixing hole (20p) at the inner periphery near the rear end, each of the two corresponding fixing holes (20p) is provided with a pin (211a).

Please refer to FIG. 5, in this embodiment, the pin (211a) is slidable in and corresponding to the annular groove (20b) of the female connector (2a), so that the mistouch prevention locking structure can rotate axially relative to the female connector (2a). This allows the user to adjust the hand position by rotating at any time according to the needs of holding or operation in a limited space.

In order to make the force transmission at the restricted position more stable and balanced, the fixing hole (20p) and the pin (211a) can be symmetrically (parallelly) formed into two sets. In addition, as shown in FIG. 3, in order to facilitate assembling, the sleeve (23) has a pin combination hole (230p) corresponding to the fixing hole (20p) for the pin (211a) to pass through. Therefore, the assembling sequence can be completed after the sleeve (23) is disposed outside the main body (21). Following, the mistouch prevention locking structure is combined with the female connector (2a), and the pins (211a) are arranged in the fixing holes (20p) of the main body (21) through the pin combination hole (230p).

Considering the limited (narrow) space, for example, when both sides of the male connector (1) and the female connector (2a) are occupied, it is difficult to have enough width in the narrow space to hold the male connector (1) and the female connector (2a) by hands, so that the present invention include a handle (232) provided at the end of the outer periphery of the rear section of the sleeve (23).

Accordingly, better gripping force can be obtained by holding the handle (232), easing the manual operation of the sleeve (23) as well as the male connector (1) and female connector (2a). Therefore, the present invention is suitable for use in systems with limited space, making it convenient for users to combine and separate in limited space.

The present invention has been described with the above embodiments thereof and it is understood that many changes and modifications in such as the form or layout pattern or practicing step of the above embodiments can be carried out without departing from the scope and the spirit of the present invention that is intended to be limited only by the appended claims.

What is claimed is:

1. A mistouch prevention locking structure comprising:
a main body with a plug channel formed inside the main body, wherein a combination groove is in the plug channel of the main body, and a hole is penetrating from one side of the combination groove;
a sleeve disposed outside the main body and provided with an opening; and
a pressing assembly having a ring body, a pressing body and a spring, the ring body being arranged in the combination groove, the pressing body being arranged inside the opening and being connected to the ring body through the hole, the spring being located between the pressing body and the main body; wherein one end of the main body is radially provided with a stopper, an outer diameter of the stopper having the same radial height as a pressing surface of the pressing body or a radial height greater than the pressing surface.

2. The mistouch prevention locking structure of claim 1, wherein the ring body is a U shape, and two ends of the U shape being connected with the pressing body to respectively form two shoulders, the pressing body and the ring body together being a L shape.

3. The mistouch prevention locking structure of claim 2, wherein a lateral width of the opening of the sleeve is smaller than a shoulder width of the ring body, so that the ring body is pressed by the opening and is not detachable from the opening of the sleeve.

4. The mistouch prevention locking structure of claim 1, wherein the pressing body extends axially along the outer surface of the main body to form a flat plate, the flat plate having the pressing surface on one side for receiving force from users, and having a receiving surface on another side facing towards the main body.

5. The mistouch prevention locking structure of claim 1, wherein the outer diameter of the stopper is higher than the pressing surface of the pressing body.

6. The mistouch prevention locking structure of claim 1, wherein an inner circumference of the ring body forms a conical inclined slope toward a front end.

7. The mistouch prevention locking structure of claim 1, wherein a handle is provided at one end of an outer periphery of a rear section of the sleeve.

8. The mistouch prevention locking structure of claim 1, wherein the main body is provided with a fixing hole at an inner periphery near a rear end of the main body and a pin provided slidably in the fixing hole and wherein the sleeve has at least one pin combination hole, the pin combination hole corresponding to the fixing hole for the pin to pass through.

9. A female connector structure comprising:
a female connector being provided with an annular groove on its outer surface near a front end thereof; and
a mistouch prevention locking structure comprising:
a main body with a plug channel formed inside the main body, wherein a combination groove is in the plug channel of the main body, and a through hole is penetrating from one side of the combination groove;
a sleeve disposed outside the main body and provided with an opening; and
a pressing assembly having a ring body, a pressing body and a spring, the ring body being arranged in the combination groove, the pressing body being arranged inside the opening and being connected to the ring body through the hole, the spring being located between the pressing body and the main body; wherein the main body of the mistouch prevention locking structure is provided with a fixing hole at an inner periphery near a rear end of the main body and corresponding to the ring groove, a pin being provided in the fixing hole, and the pin being slidable in and corresponding to an annular groove of the female connector, so that the mistouch prevention locking structure can rotate axially relative to the female connector.

10. The female connector structure of claim 9, wherein the sleeve has at least one pin combination hole, the pin combination hole being corresponding to the fixing hole for the pin to pass through.

11. The female connector structure of claim 9, wherein one end of the main body is radially provided with a stopper, an outer diameter of the stopper having the same radial height as a pressing surface of the pressing body or a radial height greater than the pressing surface.

* * * * *